(12) United States Patent
Silliman

(10) Patent No.: US 7,422,223 B1
(45) Date of Patent: Sep. 9, 2008

(54) PERSONAL, LUMBAR FRIENDLY CARGO CARRIER PACK SLED

(76) Inventor: David Joseph Silliman, 20028 SW. 72nd Ave., Tualatin, OR (US) 97062

( * ) Notice: Subject to any disclaimer, the term of this patent is extended or adjusted under 35 U.S.C. 154(b) by 384 days.

(21) Appl. No.: 10/942,669

(22) Filed: Sep. 15, 2004

(51) Int. Cl.
*B62C 11/00* (2006.01)

(52) U.S. Cl. .................. 280/190; 280/47.17; 280/47.41; 280/652; 280/645; 180/180

(58) Field of Classification Search .............. 180/180, 180/181, 186, 19.1, 784; 280/47.17, 190, 280/29, 727, 186, 189
See application file for complete search history.

(56) References Cited

U.S. PATENT DOCUMENTS

| | | | | |
|---|---|---|---|---|
| 6,193,003 B1 * | 2/2001 | Dempster | .................. | 180/180 |
| 6,467,559 B1 * | 10/2002 | Farrell et al. | ................. | 180/180 |
| 6,631,777 B1 * | 10/2003 | Thompson | .................. | 180/180 |
| 7,175,188 B2 * | 2/2007 | Joncourt | .................. | 280/47.17 |
| 7,367,749 B2 * | 5/2008 | Kim | ........................... | 405/186 |
| 2002/0125710 A1 * | 9/2002 | Akiyama et al. | ............ | 280/784 |

* cited by examiner

*Primary Examiner*—Christopher Ellis
*Assistant Examiner*—Cynthia F. Collado
(74) *Attorney, Agent, or Firm*—Mark S. Hubert

(57) ABSTRACT

This invention is a lumbar-friendly cargo carrier sled that can be used by humans to move cargo across rough or snow covered terrain and is adapted for use in conjunction with skis or wheels. The sled has an adjustable harness that articulates, by pivoting about three points in two planes. The sled frame itself flexes under dynamic loading conditions to absorb shock, and the harness is adjustable in length to transfer the majority of the load more directly onto the pelvic girdle region via a curved hip plate. The overall result is a lumbar— friendly pack sled that has the capability of maximizing the load that can be transported while minimizing the strain upon the human body.

17 Claims, 7 Drawing Sheets

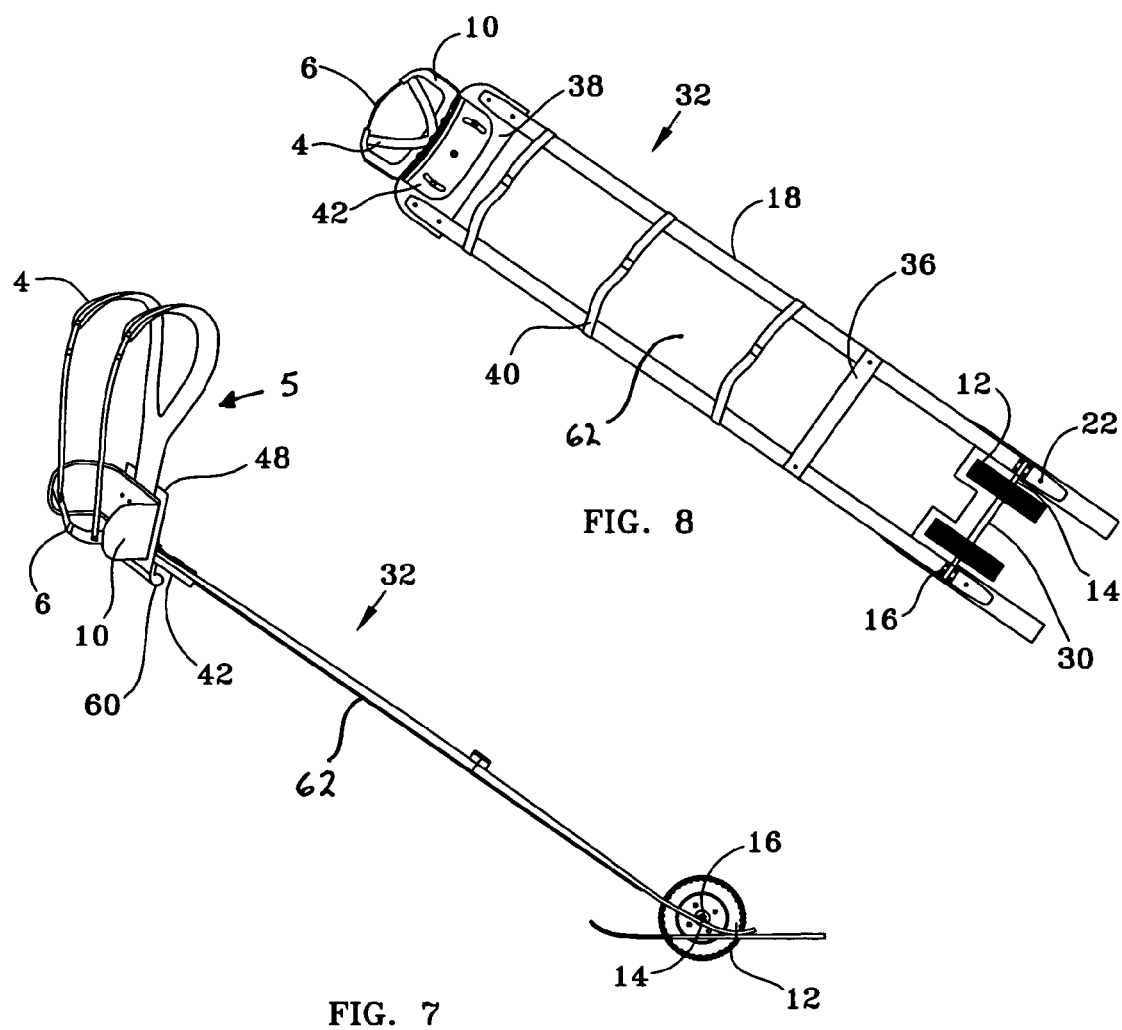

PERSONAL, LUMBAR FRIENDLY CARGO CARRIER PACK SLED

BACKGROUND OF THE INVENTION

The present invention relates to a cargo carrier that can be utilized by humans, pack animals, ATV's, snow machines or other motorized terrain crossing equipment to move cargo across rough or snow covered terrain. More particularly, to a lumbar friendly pack sled that is adapted for use in conjunction with skis or wheels, and also having the capability of maximizing the load that can be transported while minimizing the strain upon the human body.

Cargo carriers of the dragging style have long been utilized with pack animals, and are most commonly known as "travois". Although many have been adapted for use with human movers, their use has been relatively minimal. Since these devices generally attach to the upper torso, they are limited in their attachment points and focus primarily on the hips, waist or shoulders. Inevitably, the load must be fully or partially carried by the lumbar region. Since this region is prone to injury the mass of cargo that can be carried is small.

Previous personal transportation sled devices lack the ability for articulation about the XY and YZ planes simultaneously so as to compensate for the walking motion of a human. The prior art devices poorly compensate for the shock transmitted from the sled body via the sled's attachment points onto the human. These drawbacks have prevented the widespread usage of such devices.

This new cargo carrier utilizes a hinge pivotable in the XY plane between the sled and the harness, and two pivoting arrangements in the XY and YZ planes. In unison this allows limited articulation between the harness and the sled body. The sled's main body is built from ski shafts allowing flex under load as well as the ability to compensate for shifting of the center of gravity of the load under dynamic conditions. Its harness adjustment and upper pivot plate design allows for much of the weight to be directly borne by the rear pelvic girdle. Such articulation, shock absorption and weight transfer provide for the option of handling larger cargo masses without placing undue stress on the lower lumbar region of the human body, thus overcoming the abovementioned drawbacks.

SUMMARY OF THE INVENTION

In accordance with the invention, an object of the present invention is to provide an improved cargo carrier apparatus that can be safely used by humans to transport heavy cargo over rough terrains.

It is another object of this invention to provide a cargo carrier sled that has a shock absorption mechanism able to compensate for the shock generated when traversing over rough terrain.

It is a further object of this invention to provide a cargo carrier that allows a maximum of upper torso movement without transmitting unnecessary torque or strain onto the human torso.

It is still a further object of this invention to provide for a cargo carrier with an articulating harness that allows one to ski while transporting the cargo.

It is yet a further object of this invention to provide a cargo carried designed for all season, and all terrain use.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 7 is a side view of the second embodiment cargo carrier;

FIG. 8 is a top view of the second embodiment cargo carrier;

DETAILED DESCRIPTION

The cargo carrier sled apparatus of the present invention, comprises a cargo frame, a harness, and a connection plate. The second embodiment, heavy duty sled incorporates upper and lower pivotable plates joined by a connection hinge so as to form an articulating connection between the cargo frame and harness.

Figure 1:
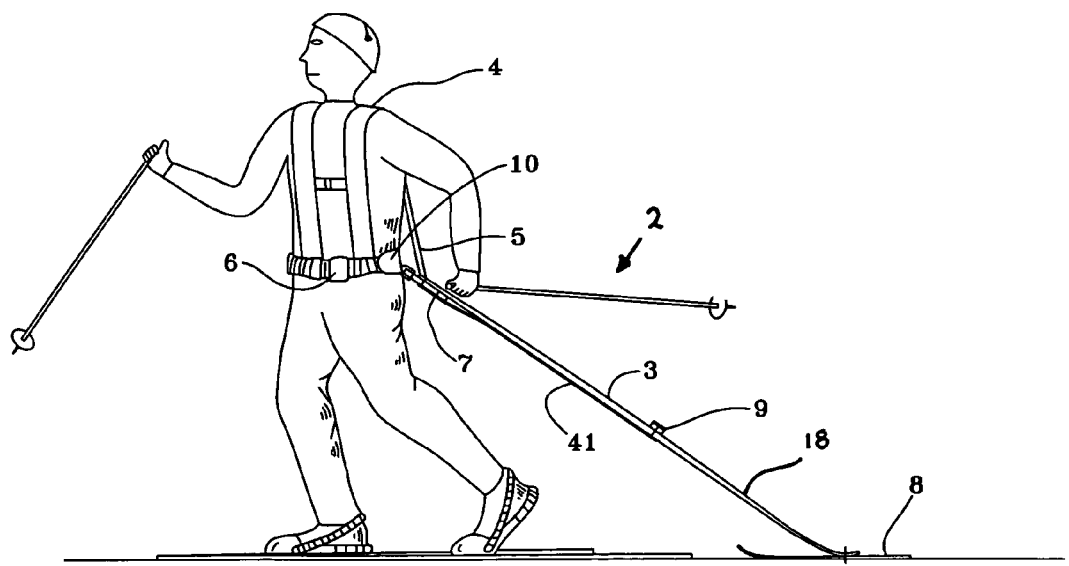
FIG. 1 is a perspective view of the first embodiment cargo carrier being used in the ski mode.
Figures 3, 4:
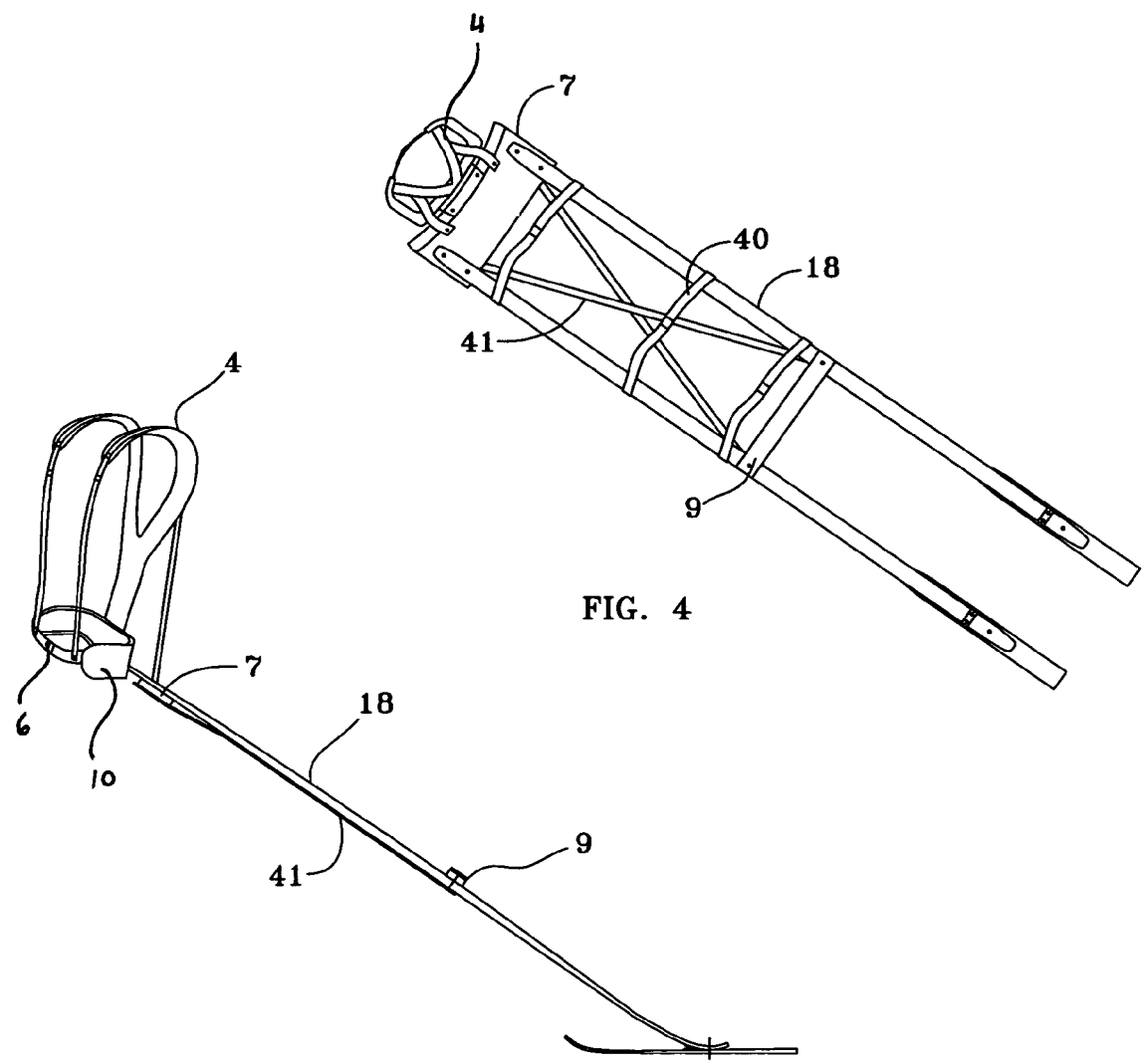
FIG. 3 is a side perspective view of the first embodiment cargo carrier in the ski mode.
FIG. 4 is a top view of the first embodiment cargo carrier in the ski mode.

Referring to FIGS. 1, 3 and 4, perspective views of the first embodiment, light duty cargo carrier, the general operation in the ski mode can be seen. Light duty cargo carrier 2 has sled body 3 strapped to human 1 by virtue of harness straps 4 and harness belt 6. Sled body 3 has two generally parallel rectangular rails 18 of tipless alpine skis. There is nothing remarkable about the skis except that the tips have been removed. The rails 18 exhibit the generally resilient, flexible and spring-like qualities imparted to all modern alpine skis. These are held in relative spacing by upper brace 7 and lower brace 9. Curved hip cradle 10 partially encircles the hip and waist region. The particular vertical location of cradle 10 is tailored to human 1 by standard adjustment straps located on the back of harness straps 4 (not shown) and the positioning of harness belt 6. Harness straps 4 are mechanically affixed to upper brace 7. As the human 1 traverses across a snow covered terrain, light duty cargo carrier 2 moves with him or her, contacting the snow along a bottom surface of ski tip 8. Adjustment is made as described above so that the weight borne by sled body 3 is transmitted to the top of the hips by hip cradle 10. This minimizes the load carried by the human's back, and allows minimal lateral movement of the sled when the human 1 is in motion.

Figure 5:
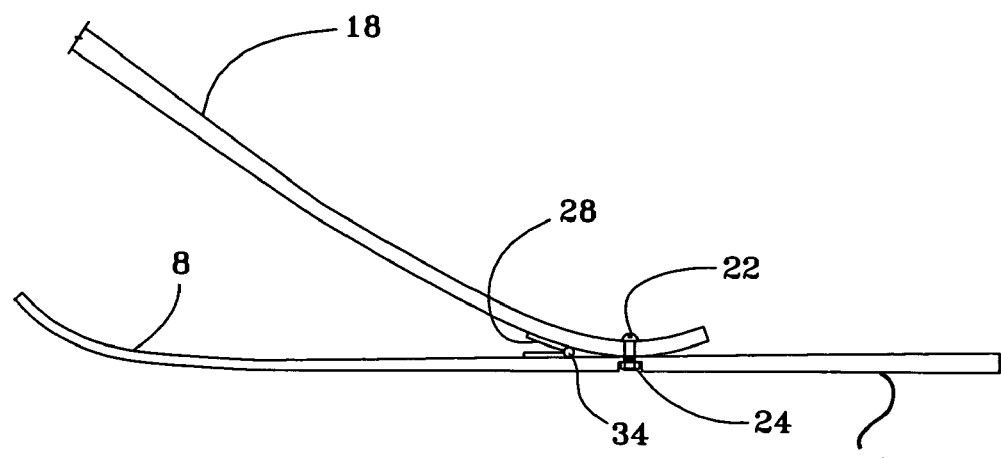
FIG. 5 is a side view of the ski attachment detail.

Looking at FIG. 5, the general arrangement of the attachment of ski tip 8 to sled rails 18 can be seen. Ski tip 8 is mechanically affixed to sled rail 18 by nut and bolt arrangement 22 which is partially nested into recess 24. Because of the contact ski tip 8 makes with the snow, nut and bolt arrangement 22 is necessarily nested into recess 24 located on the bottom side 26 of the ski tip 8. This prevents snow or ice entrapment and buildup on the bottom 26 of ski tip 8. Hinge 28 resides between ski tip 8 and sled rail 18. This serves to retain ski tip 8 aligned with the longitudinal axis of sled rail 18 while still allowing ski tip 8 to tilt about the axis of hinge pin 34.

Figure 6:
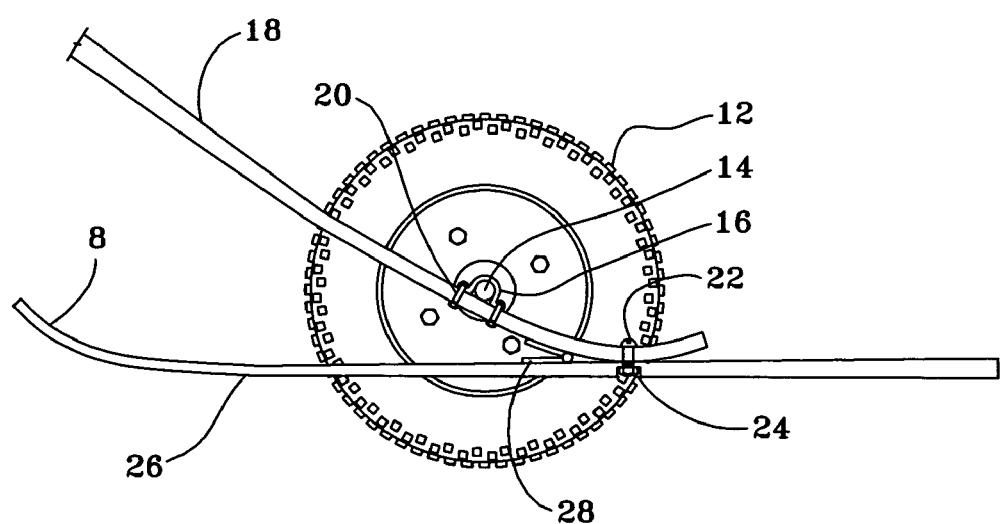
FIG. 6 is a side view of the terrain wheel attachment detail.

Referencing FIGS. 6, 7 and 8, various views of the second embodiment heavy duty cargo carrier in the wheel mode, the general assembly of the wheel mode can be seen. Here, wheel 12 has been mechanically attached to axle 14 which passes through bearing blocks 16 and is mounted to sled rails 18 by mechanical fasteners 20. Axle spacer 30 separates the wheels 12. The diameter of wheel 12 is such that ski tip 8 cannot contact the ground when wheel 12 is installed. This design choice allows for installation of wheels 12 onto heavy duty cargo carrier (sled) 32 without the removal of ski tips 8. Although bearing block fastener 20 is illustrated as a bolt and nut arrangement, there are numerous other fastening devices that are well known in the art to be the mechanical equivalent, such as circle clips and pins, screws, cross-dowel joiners or rivets to list a few. In a similar fashion, ski tips 8 are mechanically affixed to sled rails 18 by mating engagement between nut and bolt arrangement 22 (As described in detail above).

Although, only two wheels 12 are illustrated, the number of wheels 12 can vary in number as determined by the width of the wheel 12 and the size and placement of axle spacers 30. For lateral stability two wheels 12 and beyond work best. For minimized rolling friction one wheel 12 works best.

Note, that the general arrangements for the attachment of ski tips 8 and wheels 12 illustrated in FIGS. 5 and 6 are common to both the first embodiment 2 and second embodiment 32.

Figure 2:
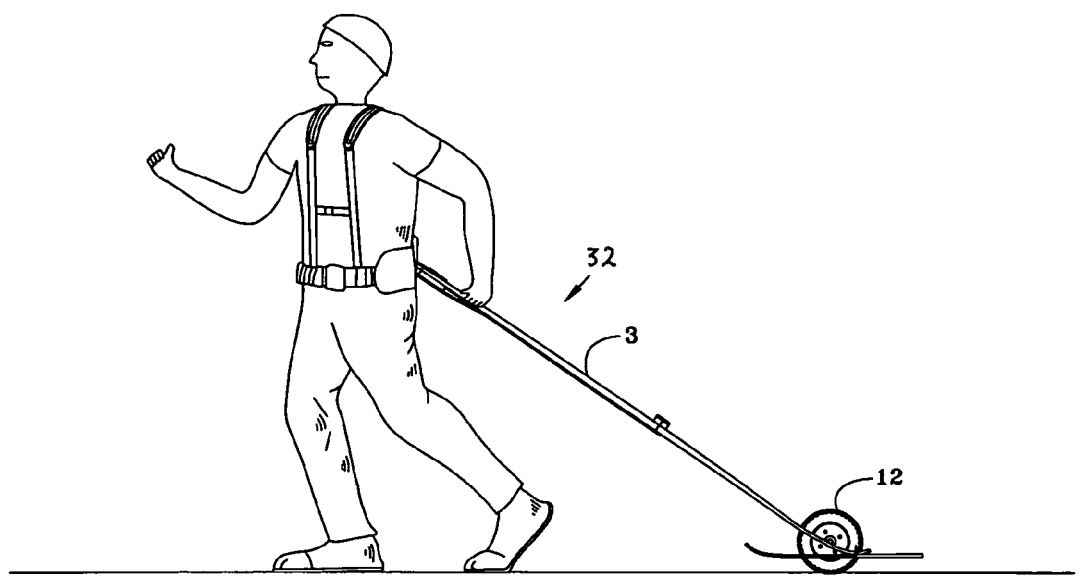
FIG. 2 is a perspective view of the second embodiment cargo carrier being used in the wheel mode.

Looking at FIGS. 2 and 7, it can be seen that the second embodiment heavy duty cargo carrier 32 has two sled rails 18 spaced substantially parallel by lower cross brace 36 and upper cross brace 38. Harness 5 has harness straps 4 sandwiched pivotally between hip cradle 10 and upper pivot plate 48. Harness belt 6 is mechanically affixed to hip cradle 10 as in the light duty embodiment 2. Heavy duty cargo carrier 32 differs from light duty cargo carrier 2 in its ability to allow the harness straps 4 and belt 6 to pivot in their respective planes thus imparting it's articulation ability. Optional adjustable hold down straps 40 span between sled rails 18.

Figure 9:
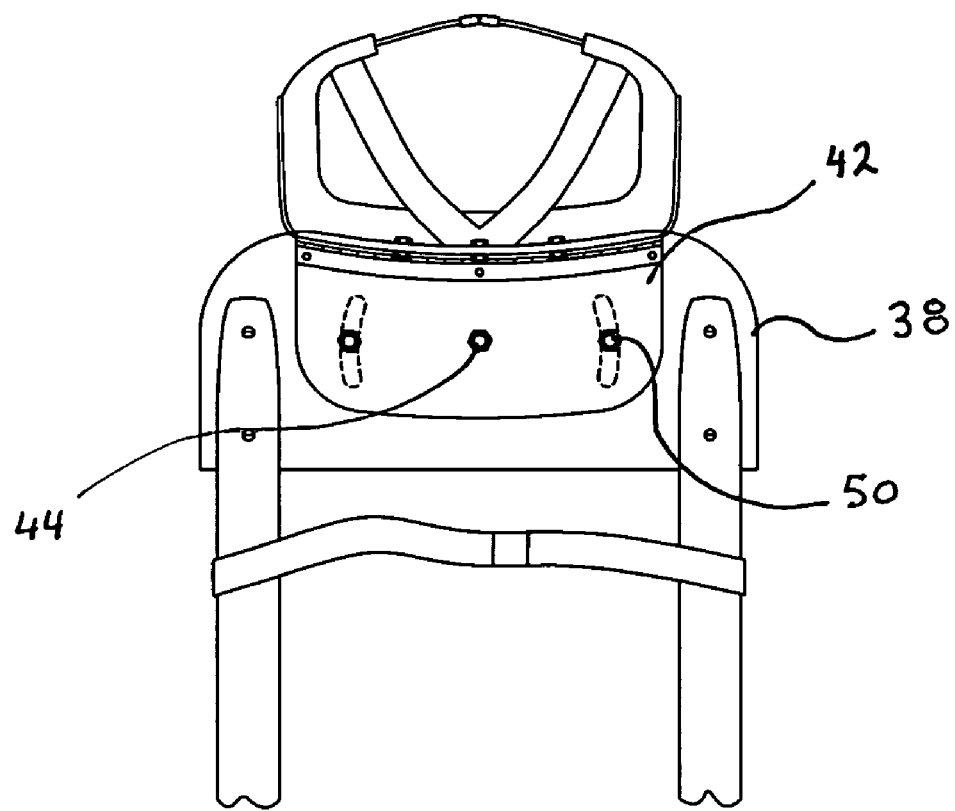
FIG. 9 is a top view of the second embodiment cargo carrier showing the X plane pivot plate.
Figure 10:
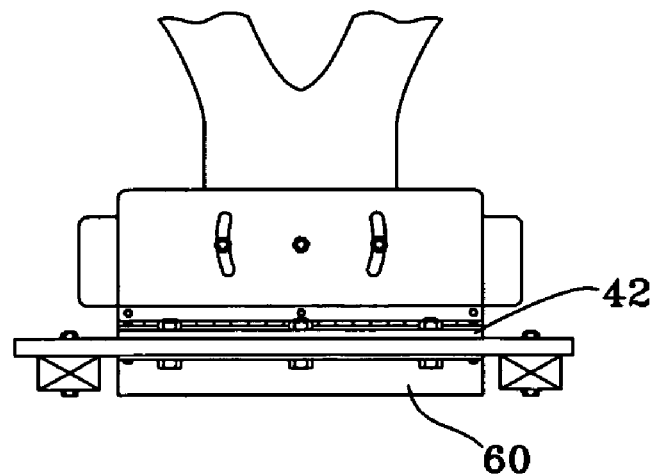
FIG. 10 is a back view of the second embodiment cross carrier showing the Y plane pivot plate.
Figure 12:
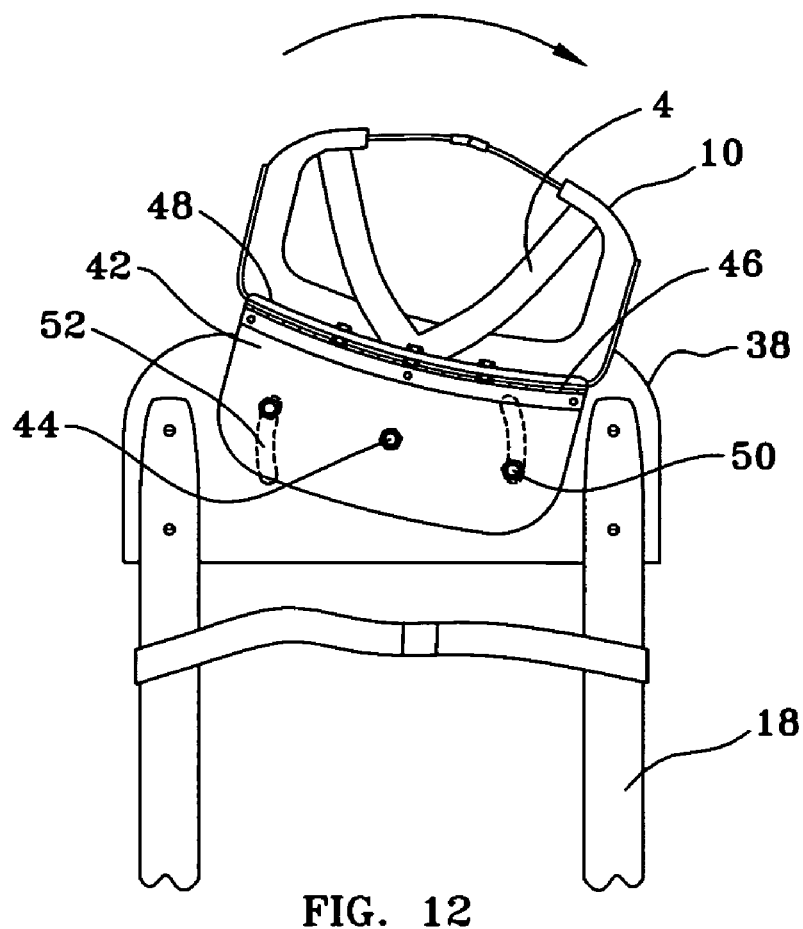
FIG. 12 is a back view of the second embodiment cross carrier showing the Y plane pivot plate tilted to the left.

Looking at FIGS. 6, 9 and 12 the pivoting capability in the XY plane can best be illustrated. Lower pivot plate 42 is attached to upper cross brace 38 by lower pivot fastener 44 at the approximate mid point of the longitudinal axis of lower pivot plate 42. Lower pivot fastener 44 extends through a corresponding sized orifice in lower pivot plate 42 and lower cross brace 38. Optional lower pivot stops 50 are rigidly affixed to lower pivot plate 42 and reside within arced lower pivot slots 52 in lower cross brace 38. With this arrangement lower pivot plate 42 is free to pivot about first pivot fastener 44 until either of lower pivot stops 50 contact lower pivot slots 52. This allows limited freedom of movement for harness straps 4, harness belt 6 and hip cradle 10 in the XY plane without any corresponding movement of the sled rails 18. Upper pivot plate 48 is mechanically affixed to hip cradle 10 in a similar fashion.

Piano hinge 46 is mechanically attached to the edges of lower pivot plate 42 and upper pivot plate 48. This allows for the harness straps 4, harness belt 6 and hip cradle 10 to tilt forward or backward without any corresponding movement in sled rails 18. Conversely, this allows for upward or downward movement of the sled rails 18 without any corresponding movement of the harness straps 4, harness belt 6 and hip cradle 10. This eliminates unnecessary rapid changes in load fort the person traversing with the sled 32.

Figure 11:
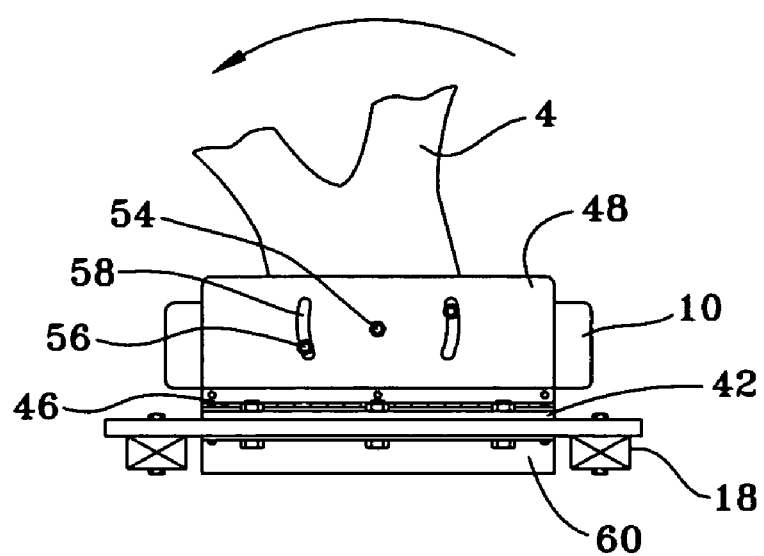
FIG. 11 is a top view of the second embodiment cargo carrier showing the X plane pivot plate tilted to the right.

Looking at FIG. 11 the pivoting design of upper pivot plate 48 and harness strap 4 can best be seen. Upper pivot plate 48 is attached to hip cradle 10 by upper pivot fastener 54 at the approximate mid point of the longitudinal axis of upper pivot plate 48. Optional upper pivot stops 56 are rigidly affixed to hip cradle 10 and reside within arced upper pivot slots 58 in upper pivot plate 48. With this arrangement upper pivot plate 48 is free to pivot about upper pivot fastener 54 until either of upper pivot stops 56 contact upper pivot slots 56. This allows for limited freedom of movement for harness straps 4, harness belt 6 and hip cradle 10 in the YZ plane without a corresponding movement of the sled rails 18.

An important feature of harness 5 is that the upper pivot plate 48 has a curved bottom edge 60 that transfers the weight on harness 5 onto the pelvic girdle and legs, minimizing the stress on the shoulder and lower lumbar regions. This bottom edge 60 may be optionally padded.

When the pivoting and hinging features of cargo carrier 32 are utilized in unison, there is a limited amount of articulation accomplished between the sled 32 and the harness 5. This allows human 1 to twist or sway his harness laden upper torso, (as would occur when walking or skiing), without transmitting any unbalanced forces to the sled 32. Effectively, the loading of the sled 32 remains mostly static and unchanged while in transit over terrain, with the mass of cargo being borne by the rear pelvic region and legs.

The support for the cargo on either sled may be accomplished using a lightweight removable plate 62 that is mechanically affixed between sled rails 18 so as to form a generally planer surface to support cargo, or by a set of removable resilient straps 41 mechanically affixed between sled rails 18. Here the light duty sled 2 utilizes straps 41 while the heavy duty sled 32 utilizes the plate 62.

Although only depicted with the light duty sled 2, hold down straps 40 may be used with either sled and may be belts, webbing, or rope utilizing such fasteners as hook and loop style, snap, clip, tooth and hole or other equivalent devices known in the art.

Sled rails 18 and ski tips 8 are fabricated from generally rectangular skis. These thus both allow for flex under load that prevents sudden shock transmission to the user as well as allowing for movement in relation to torsional loads encountered when traversing uneven terrain.

Both embodiments also intended for use with ATV's, snowmobiles and other similar terrain crossing mechanized equipment. For such applications the harness including cradle would be removed and the upper pivot plate would be mechanically affixed to the machine.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

Having thus described the invention, what is claimed as new and desired to be secured by Letters Patent is as follows:

1. A pack sled adapted for human use over snow or earthen covered terrain comprising:
   a harness adapted for human wear having a first pivot member residing in the X axis;
   a flexible frame having least two non rigid tipless alpine ski bodies adapted to form generally parallel frame rails and a second pivot member residing in the Z axis;

at least one friction reducing, ground contact member mechanically attached to a lower end of each said frame rail; and a third pivot member residing in the Y axis and joining said harness to said frame;

wherein said harness is capable of limited movement about the X, Y and Z axes of the respective pivot members relative to said frame.

2. The pack sled of claim 1 wherein said frame comprises an upper and lower spaced cross member mechanically attached generally perpendicular onto each frame rail so as to maintain said rails in a spaced and generally parallel configuration.

3. The pack sled of claim 2 wherein said harness comprises;
an adjustable waist belt;
a pair of adjustable shoulder straps having a first end and a second end; and
a curved hip cradle,
wherein said belt is connected to said cradle and is adapted to cinch said cradle tight to a human pelvic girdle region, and wherein said first end of each said strap is connected to said belt and said second end of each said strap is mechanically attached to said cradle.

4. The pack sled of claim 3 wherein said ground contact member is a ski tip hingedly directly attached to a bottom side of said frame rail lower end, having a longitudinal axis vertically aligned to a longitudinal axis of said frame rails.

5. The pack sled of claim 4 further comprising:
at least one wheel having a central aperture;
a wheel axle adapted to pass through said aperture and traverse between said rails thereby allowing the rotation of said wheel; and
a wheel axle housing mechanically attached to said lower end of each said frame rail for constraining said axle, wherein said wheel resides between said rails.

6. The pack sled of claim 4 wherein said third pivot member is a piano hinge adapted to allow limited pivotal movement of said upper pivot plate, said cradle and said harness strap in a horizontal plane relative to said third pivot member, and wherein said hinge is connected to said upper pivot plate and said lower pivot plate.

7. The pack sled of claim 6 wherein said harness further comprises an upper pivot plate defining at least one arced aperture therein, said upper pivot plate housing the first pivot member adapted to allow limited pivotal movement of said cradle and said harness strap in a vertical plane about said first pivot member, and wherein said upper pivot plate is connected to said connection member and said cradle.

8. The pack sled of claim 7 wherein said frame further comprises a lower pivot plate housing the second pivot member adapted to allow limited pivotal movement of said harness, said connection plate and said upper pivot plate in a horizontal plane about said second pivot member, and wherein said lower pivot plate is connected to said connection member and said cross member.

9. The pack sled of claim 8 wherein said upper pivot plate has a rolled edge that extends below said cradle and is contoured to reside upon the hips.

10. The pack sled of claim 9 wherein said harness further comprises at least one pivot stop pin having a first end and a second end, said first end mechanically affixed to said cradle and said second end residing in said arched aperture of said upper pivot plate.

11. The pack sled of claim 10 wherein said upper cross member has at least one arced slot defined therein, and wherein said lower pivot plate further comprises at least one pivot stop pin having a first end and a second end, said first end mechanically affixed to said lower pivot plate and said second end residing in said arced slot of said upper cross member.

12. The pack sled of claim 11 further comprising a load supporting platform residing between said frame rails and mechanically attached to each of said frame rails.

13. The pack sled of claim 12 wherein said load supporting platform is a resilient plate.

14. The pack sled of claim 12 wherein said load supporting platform is formed from resilient webbing.

15. An articulating pack sled adapted for human use over snow or earthen covered terrain comprising:
a belted harness with a resilient curved waist cradle and an upper pivot member residing with a first pivot axis in the X axis and adapted to allow said harness to pivot vertically about said pivot member;
a harness support attached to said cradle and adapted to rest on the rear pelvic girdle region;
a flexible frame having least two tipless ski shaft frame rails held in generally parallel configuration by an upper and lower cross member;
a load platform spanning between said frame rails;
two ski tips hingedly attached to a lower end of said frame rail;
a lower pivot member residing with a second pivot axis in the Z axis and affixed to said upper cross member of said frame and adapted to allow said harness to pivot horizontally about said lower pivot member; and
a connection pivot member residing with a third pivot axis in the Y axis and joining said harness to said lower pivot member,
wherein said harness has any combination of limited movement in the X, Y and Z planes without any corresponding movement of said sled frame.

16. The articulating pack sled of claim 15 further comprising at least one wheel residing between said frame rails and held in place by a wheel axle having two ends, each end mechanically attached to a frame rail.

17. The articulating pack sled of claim 16 wherein the number of wheels is two.

* * * * *